(12) United States Patent
Chiu et al.

(10) Patent No.: US 10,396,441 B2
(45) Date of Patent: Aug. 27, 2019

(54) COMMUNICATION DEVICE AND MANUFACTURING METHOD THEREOF

(71) Applicant: PRINCO CORP., Hsinchu (TW)

(72) Inventors: Pei-liang Chiu, Hsinchu (TW); Phou-shen Ou, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 208 days.

(21) Appl. No.: 15/495,505

(22) Filed: Apr. 24, 2017

(65) Prior Publication Data

US 2018/0205140 A1    Jul. 19, 2018

(30) Foreign Application Priority Data

Jan. 19, 2017  (TW) .............................. 106101868 A

(51) Int. Cl.

| | | |
|---|---|---|
| *H01Q 1/27* | (2006.01) | |
| *G04G 21/04* | (2013.01) | |
| *G04G 9/00* | (2006.01) | |
| *G06F 1/16* | (2006.01) | |
| *H04B 1/3827* | (2015.01) | |
| *G04R 60/06* | (2013.01) | |
| *G04R 20/26* | (2013.01) | |
| *H01Q 1/22* | (2006.01) | |

(Continued)

(52) U.S. Cl.
CPC .............. *H01Q 1/273* (2013.01); *G04G 9/00* (2013.01); *G04G 21/04* (2013.01); *G04R 20/26* (2013.01); *G04R 60/06* (2013.01); *G06F 1/163* (2013.01); *H04B 1/385* (2013.01); *H01Q 1/2216* (2013.01); *H04M 1/026* (2013.01); *H04M 2250/04* (2013.01); *H04W 4/80* (2018.02)

(58) Field of Classification Search
CPC ........ H01Q 1/273; H01Q 1/526; G04G 21/04; G04R 20/26; G04R 60/06
See application file for complete search history.

(56) References Cited

U.S. PATENT DOCUMENTS

| | | | |
|---|---|---|---|
| 2003/0117900 A1 | 6/2003 | Fujisawa et al. | |
| 2007/0070818 A1* | 3/2007 | Inomata | ................. G04G 21/04 368/10 |
| 2007/0297294 A1 | 12/2007 | Vuilleumier et al. | |

(Continued)

FOREIGN PATENT DOCUMENTS

| | | |
|---|---|---|
| CN | 202975608 | 6/2013 |
| EP | 1633017 A1 | 3/2006 |

(Continued)

*Primary Examiner* — Daniel Munoz
(74) *Attorney, Agent, or Firm* — Kirton McConkie; Evan R. Witt

(57) ABSTRACT

A communication device and a manufacturing method thereof are disclosed. The communication device includes a top cover, a housing, a bottom cover, a first magnetic isolation layer, and a short distance communication module. The housing is made of a metal material or an electrically conductive material. The top cover, the housing, and the bottom cover are assembled to construct an accommodating space from top to bottom. The first magnetic isolation layer is formed on a surface of the housing facing the accommodating space. The short distance communication module is disposed in the accommodating space. The communication device can prevent electromagnetic waves from being affected by the housing.

14 Claims, 3 Drawing Sheets

(51) Int. Cl.
*H04W 4/80* (2018.01)
*H04M 1/02* (2006.01)

(56) References Cited

U.S. PATENT DOCUMENTS

| | | | | |
|---|---|---|---|---|
| 2014/0354494 | A1* | 12/2014 | Katz | H01Q 1/273 343/718 |
| 2016/0056526 | A1* | 2/2016 | Li | H01Q 9/42 343/702 |
| 2016/0142866 | A1* | 5/2016 | Jang | H01Q 1/273 455/41.1 |
| 2016/0205229 | A1* | 7/2016 | Vincent | H01Q 1/273 455/575.7 |
| 2017/0045916 | A1* | 2/2017 | Kim | G06F 3/041 |

FOREIGN PATENT DOCUMENTS

| | | |
|---|---|---|
| JP | 10-197662 A | 7/1998 |
| JP | 2001-208875 A | 8/2001 |
| JP | 2002-197421 A | 7/2002 |
| JP | 2003-50983 A | 2/2003 |
| JP | 2005-260765 A | 9/2005 |
| JP | 2012-205025 A | 10/2012 |
| JP | 2013-205333 A | 10/2013 |
| TW | 201426216 | 7/2014 |
| WO | 2003/023525 A1 | 3/2003 |
| WO | 2016065836 | 5/2016 |
| WO | 2017/026867 A1 | 2/2017 |

\* cited by examiner

COMMUNICATION DEVICE AND MANUFACTURING METHOD THEREOF

BACKGROUND OF THE INVENTION

Field of Invention

The present disclosure relates to a communication field, and more particularly to a communication device.

Description of Prior Art

In radio frequency identification (RFID) technology in which a frequency of 13.56 megahertz (MHz) is used, an RFID chip is manufactured as an RFID tag, and a reader reads data stored in the RFID tag by transmitting and receiving electromagnetic waves. Near field communication (NFC) is another technology using this frequency. NFC also uses magnetic induction principle to control electronic devices to connect and communicate with each other in a short distance. Based on the RFID technology, NFC can provide a medium of an identification protocol and provide reliable data transmission.

Currently, it is not feasible to dispose an RFID chip or an NFC chip in a device with a metal housing or an electrically conductive housing, because the metal housing or the electrically conductive housing affects the RFID chip or the NFC chip seriously. That is, electromagnetic waves transmitted by a reader are interfered by the metal housing or the electrically conductive housing, and thus the electromagnetic waves which can be received by the RFID chip or the NFC chip are limited.

Consequently, there is a need to solve the above-mentioned problem in the prior art.

SUMMARY OF THE INVENTION

The present disclosure provides a communication device and a manufacturing method thereof capable of solving the problem that electromagnetic waves are interfered by a metal housing or an electrically conductive housing in the prior art.

The communication device in accordance with the present disclosure comprises a top cover; a housing made of a metal material or an electrically conductive material; a bottom cover, wherein the top cover, the housing, and the bottom cover construct an accommodating space from top to bottom, the accommodating space has a diameter equal to or less than 5 centimeters, and a vertical distance from the top cover to the bottom cover is equal to or less than 3 centimeters; a first magnetic isolation layer formed on a surface of the housing facing the accommodating space; and a short distance communication module disposed in the accommodating space, and the short distance communication module having a communication distance equal to or less than 10 centimeters.

The communication device in accordance with the present disclosure comprises a top cover; a housing made of a metal material or an electrically conductive material; a bottom cover made of a non-metal material or a non-electrically conductive material, wherein the top cover, the housing, and the bottom cover construct an accommodating space from top to bottom, the accommodating space has a diameter equal to or less than 5 centimeters, and a vertical distance from the top cover to the bottom cover is equal to or less than 3 centimeters; a first magnetic isolation layer formed on a surface of the housing facing the accommodating space; a time display element disposed in the accommodating space, and the time display element including an electromagnetic wave permeable material; a short distance communication module disposed under the time display element, and the short distance communication module having a communication distance equal to or less than 10 centimeters; a second magnetic isolation layer disposed under the short distance communication module; and a movement disposed in the accommodating space and positioned under the second magnetic isolation layer.

The communication device in accordance with the present disclosure comprises a top cover; a housing made of a metal material or an electrically conductive material; a bottom cover made of a metal material or an electrically conductive material, wherein the top cover, the housing, and the bottom cover construct an accommodating space from top to bottom, the accommodating space has a diameter equal to or less than 5 centimeters, and a vertical distance from the top cover to the bottom cover is equal to or less than 3 centimeters; a first magnetic isolation layer formed on a surface of the housing facing the accommodating space; a time display element disposed in the accommodating space, and the time display element including an electromagnetic wave permeable material; a short distance communication module disposed under the time display element, and the short distance communication module having a communication distance equal to or less than 10 centimeters; and a movement disposed under the time display element.

The manufacturing method of the communication device in accordance with the present disclosure comprises providing a top cover, a housing, and a bottom cover, wherein the housing is made of a metal material or an electrically conductive material, and the top cover, the housing, and the bottom cover construct an accommodating space from top to bottom; forming a first magnetic isolation layer on an inner surface of the housing; disposing a short distance communication module under the first magnetic isolation layer; and assembling the top cover, the housing, and the bottom cover to be the communication device.

In the communication device and the manufacturing method thereof in accordance with the present disclosure, at least one magnetic isolation layer capable of absorbing electromagnetic waves is disposed, so as to avoid a situation that the electromagnetic waves cannot be received by the short distance communication module because the electromagnetic waves are affected by the housing made of the metal material or the electrically conductive material. As a result, the short distance communication device can be disposed in the communication device with the housing made of the metal material or the electrically conductive material.

DETAILED DESCRIPTION OF THE PREFERRED EMBODIMENTS

Figure 1:
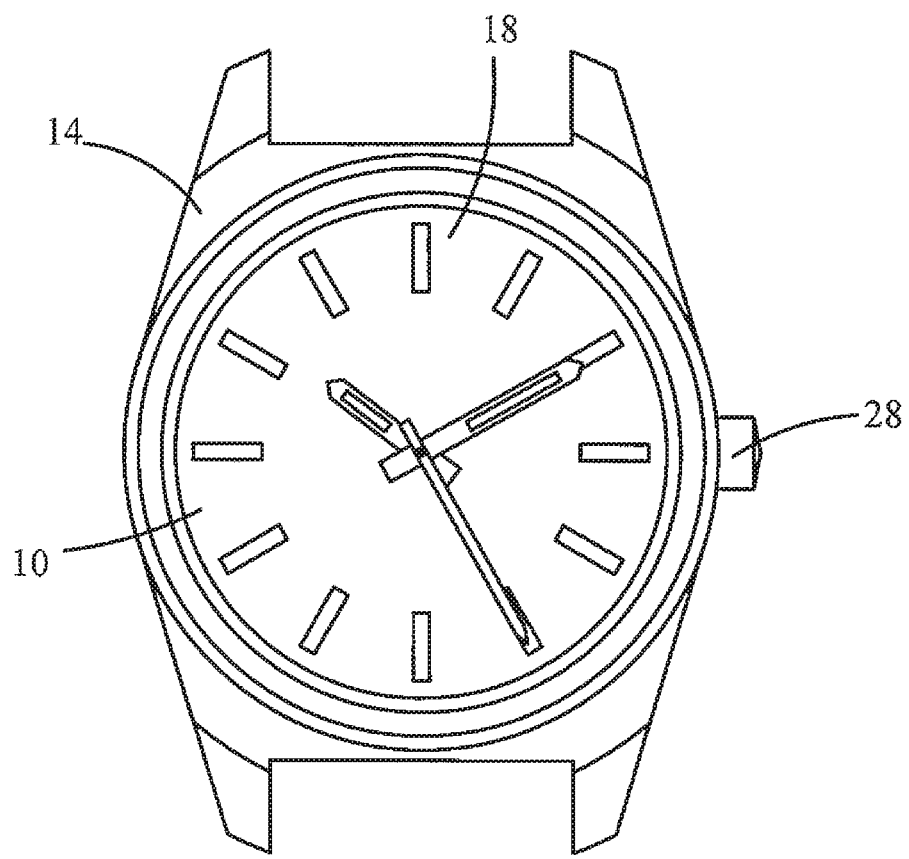
FIG. 1 shows a top view of a communication device in accordance with an embodiment of the present disclosure.
Figure 2:
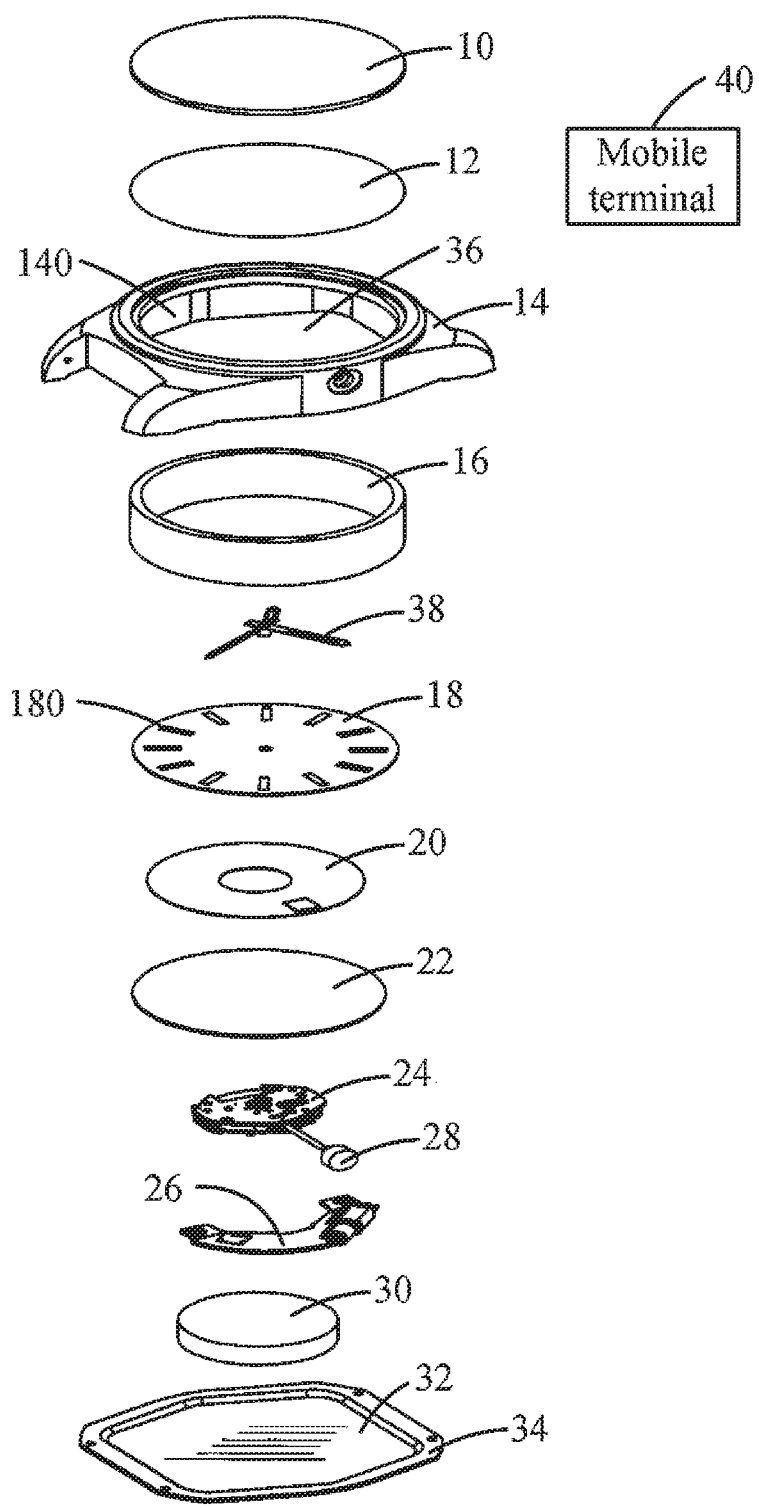
FIG. 2 shows an exploded view of the communication device shown in FIG. 1.

The present disclosure provides a communication device. The communication device includes a short distance communication module disposed therein. The communication device may be but not limited to a device including a housing made of a metal material or an electrically conductive material, such as a wristwatch, a bracelet, a keychain. Please refer to FIG. 1 and FIG. 2. FIG. 1 shows a top view of a communication device in accordance with an embodiment of the present disclosure. FIG. 2 shows an exploded view of the communication device shown in FIG. 1.

The communication device includes a top cover 10, an antenna 12, a housing 14, a first magnetic isolation layer 16, a time display element 18, a short distance communication module 20, a second magnetic isolation layer 22, a movement 24, a functional module 26, a crown 28, a battery 30, a third magnetic insulation layer 32, and a bottom cover 34.

The top cover 10, the housing 14, and the bottom cover 34 construct an accommodating space 36 from top to bottom. The accommodating space 36 has a diameter equal to or less than 5 centimeters (cm). After the top cover 10, the housing 14, and the bottom cover 34 are assembled, a vertical distance from the top cover 10 to the bottom cover 34 is equal to or less than 3 cm. The housing 14 is made of a metal material or an electrically conductive material.

Preferably, the top cover 10 is made of a transparent material (such as a glass). The antenna 12 is formed on a bottom surface of the top cover 10. It is noted that the antenna 12 is a short distance communication antenna. The antenna 12 is operated at a frequency ranged from 2.4 gigahertz (GHz) to 2.485 GHz. That is, the antenna 12 is a BLUETOOTH antenna. When the antenna 12 transmits or receives signals, the signals are not shielded by the housing 14 made of the metal material or the electrically conductive material. Preferably, the antenna 12 may be a light-permeable structure. When the antenna 12 is formed on the bottom surface of the top cover 10, a structure formed by the top cover 10 and the antenna 12 still has a transmittance greater than 70%. Accordingly, when a user checks the time through the top cover 10, the user is not affected by the antenna 12.

The housing 14 is made of the metal material or the electrically conductive material. The metal material or the electrically conductive material affects transmitting and receiving of electromagnetic waves (data) of the short distance communication module 20. In order to reduce effect of the housing 14 on the short distance communication module 20, the communication device of the present disclosure includes the first magnetic isolation layer 16 disposed therein. The first magnetic isolation layer 16 is formed on a surface of the housing 14 facing the accommodating space 36 (i.e., an inner surface of the housing 14). The first magnetic isolation layer 16 can absorb electromagnetic waves to achieve effect of suppressing electromagnetic wave interference.

The bottom cover 34 may be made of a metal material or an electrically conductive material. In another embodiment, the bottom cover 34 may be made of a non-metal material or a non-electrically conductive material.

In the present embodiment, the time display element 18 is disposed in the accommodating space 36 and includes physical scales 180 (e.g., one o'clock to twelve o'clock) and at least one indicator 38 (e.g., physical hands including an hour hand, a minute hand, and a second hand) disposed on the physical scales 180. The at least one indicator 38 is driven by the movement 24 and cooperates with the physical scales 180 of the time display element 18 to show the time. Through the transparent top cover 10 and the antenna 12, the user can perceive the position information (i.e., time information) indicated by the at least one indicator 180. The time display element 18 includes an electromagnetic wave permeable material. That is, electromagnetic waves can penetrate through the time display element 18.

It is noted that in the present embodiment, the communication device is a watch including the at least one indicator 180, and the time display element 18 is a dial. In another embodiment, the communication device is a digital watch, and the time display element 18 is a display which displays time in digits.

The short distance communication module 20 is disposed and fixed under the time display element 18. The short distance communication module 20 may be an RFID module or an NFC module. The short distance communication module 20 is operated at a frequency of 13.56 MHz. The short distance communication module 20 has a communication distance equal to or less than 10 cm. Specifically, the short distance communication module 20 can communicate with an external device (such as a reader) within the communication distance.

In the present embodiment, the communication device further includes the second magnetic isolation layer 22 disposed under the short distance communication module 20. The second magnetic isolation layer 22 can absorb electromagnetic waves to achieve effect of suppressing electromagnetic wave interference. Preferably, the second magnetic isolation layer 22 is adhered to a lower surface of the short distance communication module 20.

The functional module 26 is disposed under the second magnetic isolation layer 22. The functional module 26 can communicate with a mobile terminal 40 via the antenna 12. Since the antenna 12 is a BLUETOOTH antenna which is operated at a frequency ranged from 2.4 GHz to 2.485 GHz, the communication device can perform BLUETOOTH communication with the mobile terminal 40. It is noted that when the communication device is a wristwatch structure, the functional module 18 may be disposed in a watch strap of the wristwatch structure.

The communication has the crown 28 disposed at the lateral side thereof. The user can adjust the correct time or set an alarm by turning a knob on the crown 28.

The battery 30 can provide power required by the movement 24 and/or the short distance communication module 20 and/or the functional module 26. The battery 30 may be a primary battery or a secondary battery.

The third magnetic isolation layer 32 is formed on the bottom cover 34. The third magnetic isolation layer 32 can absorb electromagnetic waves to achieve effect of suppressing electromagnetic wave interference.

The top cover 10, the housing 14, and the bottom cover 34 are used to protect mechanical structures and/or electronic devices inside the communication device.

In the communication device of the present disclosure, when the short distance communication module 20 communicates with an external device (e.g., a reader), electromagnetic waves are transmitted from the external device to the short distance communication module 20. The first magnetic isolation layer 16 and the second magnetic isolation layer 22 can absorb the electromagnetic waves to avoid a situation that the electromagnetic waves cannot be received by the short distance communication module 20 because the electromagnetic waves are affected by the housing 14 and other metal elements in the accommodating space 36. Furthermore, the second magnetic isolation layer 22 can avoid a situation that the short distance communication module 20 is affected by the functional module 26 and other metal elements under the second magnetic isolation layer 22. That is, the second magnetic isolation layer 22 can achieve effect of suppressing electromagnetic wave interference.

It is noted that the third magnetic isolation layer 32 is an optional element. The third magnetic isolation layer 32 can further absorb electromagnetic waves which are not absorbed by the first magnetic isolation layer 16 and the second magnetic isolation layer 22.

It is noted that the short distance communication module 20 is operated at a frequency of 13.56 MHz, and the functional module 26 is operated at a frequency ranged from 2.4 GHz to 2.485 GHz. Accordingly, signals of the short distance communication module 20 and signals of the functional module 26 do not interfere with each other.

It is noted that the communication device in FIG. 1 is a wristwatch structure. In another embodiment, the communication device may only include the top cover 10, the housing 14, the first magnetic isolation layer 16, the short distance communication module 20, and the bottom cover 34.

Figure 3:
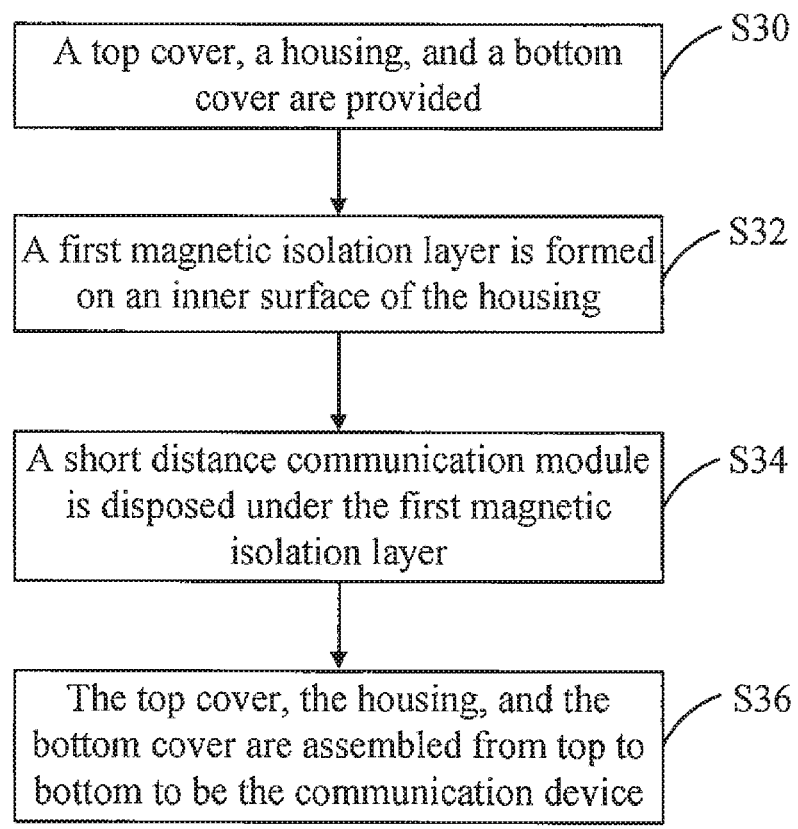
FIG. 3 shows a schematic flowchart of a manufacturing method of a communication device in accordance with an embodiment of the present disclosure.

Please refer to FIG. 3. FIG. 3 shows a schematic flowchart of a manufacturing method of a communication device in accordance with an embodiment of the present disclosure.

In step S30, a top cover, a housing, and a bottom cover are provided. The housing is made of a metal material or an electrically conductive material. The top cover, the housing, and the bottom cover construct an accommodating space from top to bottom.

In step S32, a first magnetic isolation layer is formed on an inner surface of the housing.

In step S34, a short distance communication module is disposed under the first magnetic isolation layer. In another embodiment of the present disclosure, the manufacturing method further includes forming a second magnetic isolation layer under the short distance communication module after the short distance communication module is disposed under the first magnetic isolation layer. In yet another embodiment, the manufacturing method further includes forming a third magnetic isolation layer on the bottom cover after forming the second magnetic isolation layer under the short distance communication module.

In step S36, the top cover, the housing, and the bottom cover are assembled from top to bottom to be the communication device.

In the prior art, a short distance communication module cannot be disposed in a communication device with a metal housing or an electrically conductive housing. In the communication device of the present disclosure, at least one magnetic isolation layer capable of absorbing electromagnetic waves is disposed, so as to avoid a situation that the electromagnetic waves cannot be received by the short distance communication module because the electromagnetic waves are affected by the housing made of the metal material or the electrically conductive material. As a result, the short distance communication device (e.g., an RFID module or an NFC module) can be disposed in the communication device with the housing made of the metal material or the electrically conductive material.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A communication device, comprising:
a top cover;
an antenna formed on a bottom surface of the top cover;
a housing made of a metal material or an electrically conductive material;
a bottom cover, wherein the top cover, the housing, and the bottom cover construct an accommodating space from top to bottom;
a first magnetic isolation layer formed on a surface of the housing facing the accommodating space;
a short distance communication module disposed in the accommodating space, and the short distance communication module having a communication distance equal to or less than 10 centimeters;
a second magnetic isolation layer disposed under the short distance communication module;
a movement disposed in the accommodating space and positioned under the second magnetic isolation layer; and
a functional module disposed under the second magnetic isolation layer, wherein the functional module communicates with a mobile terminal via the antenna.

2. A communication device, comprising:
a top cover;
an antenna formed on a bottom surface of the top cover;
a housing made of a metal material or an electrically conductive material;
a bottom cover made of a non-metal material or a non-electrically conductive material, wherein the top cover, the housing, and the bottom cover construct an accommodating space from top to bottom;
a first magnetic isolation layer formed on a surface of the housing facing the accommodating space;
a time display element disposed in the accommodating space, and the time display element including an electromagnetic wave permeable material;
a short distance communication module disposed under the time display element, and the short distance communication module having a communication distance equal to or less than 10 centimeters;
a second magnetic isolation layer disposed under the short distance communication module;
a movement disposed in the accommodating space and positioned under the second magnetic isolation layer; and
a functional module disposed under the second magnetic isolation layer, wherein the functional module communicates with a mobile terminal via the antenna.

3. The communication device of claim 2, wherein the antenna is operated at a frequency ranged from 2.4 gigahertz to 2.485 gigahertz.

4. The communication device of claim 3, wherein a structure formed by the top cover and the antenna has a transmittance greater than 70%.

5. The communication device of claim 2, wherein the time display element comprises physical scales and at least one indicator disposed on the physical scales.

6. The communication device of claim 2, wherein the short distance communication module is a radio frequency identification module.

7. The communication device of claim 2, wherein the short distance communication module is a near field communication module.

8. A communication device, comprising:
a top cover;
an antenna formed on a bottom surfacee of the top cover;
a housing made of a metal material or an electrically conductive material;

a bottom cover made of a metal material or an electrically conductive material, wherein the top cover, the housing, and the bottom cover construct an accommodating space from top to bottom;

a first magnetic isolation layer formed on a surface of the housing facing the accommodating space;

a time display element disposed in the accommodating space, and the time display element including an electromagnetic wave permeable material;

a short distance communication module disposed under the time display element, and the short distance communication module having a communication distance equal to or less than 10 centimeters;

a movement disposed under the time display element;

a second magnetic isolation layer disposed under the short distance communication module; and a functional module disposed under the second magnetic isolation layer, wherein the functional module communicates with a mobile terminal via the antenna.

9. The communication device of claim 8, wherein the antenna is operated at a frequency ranged from 2.4 GHz to 2.485 GHz.

10. The communication device of claim 9, wherein a structure formed by the top cover and the antenna has a transmittance greater than 70%.

11. The communication device of claim 8, wherein the time display element comprises physical scales and at least one indicator disposed on the physical scales.

12. The communication device of claim 8, wherein the short distance communication module is a radio frequency identification module.

13. The communication device of claim 8, wherein the short distance communication module is a near field communication module.

14. The communication device of claim 8, further comprising a third magnetic isolation layer formed on the bottom cover.

* * * * *